Patented Feb. 24, 1953

2,629,744

UNITED STATES PATENT OFFICE 2,629,744

ISOPROPYLBENZENE TREATMENT

George G. Joris, Convent, N. J., assignor to Allied Chemical & Dye Corporation, New York, N. Y., a corporation of New York No Drawing. Application September 19, 1950, Serial No. 185,689

3 Claims. (Cl. 260—610)

This invention relates to treatment of an isopropylbenzene to condition it for oxidation by elemental oxygen to hydroperoxide. Isopropylbenzenes to which this invention applies include cumene, cymenes, diisopropylbenzenes, etc.

Samples of isopropylbenzenes such as cumene are highly variable in their initial susceptibility to oxidation by elemental oxygen, e. g. by air, to hydroperoxide such as cumene hydroperoxide. Samples frequently show induction periods of many hours during which little or no hydroperoxide is formed even though oxidizing conditions have been established.

The variability of these induction periods indicates they may be due to inhibitor impurities; but effective removal of such impurities presents difficulty because of the extreme sensitivity of isopropylbenzenes thereto. For example, even spectroscopically pure cumene of narrow boiling range shows induction periods which are frequently of many hours duration.

I have now found that contacting cumene or other isopropylbenzenes with a specific adsorbent material, namely highly porous, adsorptive alumina such as Activated Alumina (the trade name of a commercial product) minimizes induction periods in subsequent oxidation of the isopropylbenzene.

Apparently the beneficial effect of alumina is due to special affinity of alumina for inhibitor impurities in isopropylbenzenes; for like treatment with other solid adsorbents including silica gel and activated charcoal has little or no effect on the oxidizability of e. g. cumene samples. My invention is not, however, to be regarded as limited by the foregoing theory of its principle of operation.

Specific embodiments of my process, illustrative of my invention but not to be considered as limiting the same, are set forth in the following examples.

Example 1 (a)—Commercial cumene was shaken with 2.5% by weight of Activated Alumina powder and filtered twice, giving a clear filtrate. The cumene so treated was fed to a conical reactor maintained at 90° C. to which 2 grams of dry powdered commercial soda ash per 100 cc. of cumene were added. Air was bubbled through the cumene at a rate which maintained the soda ash in suspension.

After 5 hours the concentration of cumene hydroperoxide in the reaction mixture was determined by iodometric method and was 2.5% by weight, corresponding to an average rate of cumene hydroperoxide formation, over the first 5 hours, of 0.5% by weight of cumene hydroperoxide per hour. At the end of the reaction period of 40.5 hours, the cumene hydroperoxide concentration was 31.6% by weight and cumene hydroperoxide was being formed at a rate of about 0.9 weight percent per hour as determined by periodic measurements of cumene hydroperoxide concentrations. The overall average rate of cumene hydroperoxide formation was about 0.8 weight percent per hour.

The reaction mixture thus obtained was submitted to vacuum distillation to remove unreacted cumene and the yield of cumene hydroperoxide in percent of theory based on cumene reacted was calculated assuming all cumene not recovered had been oxidized to cumene hydroperoxide or to byproducts. The yield thus determined was 90.7% of theory. It should be noted that the iodometric method of measurement of cumene hydroperoxide gives systematically low results, about 3–4% low, and that handling losses count as oxidized cumene. Accordingly, the true cumene hydroperoxide yield in this example is at least about 95% of theory based on reacted cumene.

(b) When a like sample of cumene was oxidized by the procedure above described under like conditions but without preliminary treatment the average rate of cumene hydroperoxide formation in the first 5 hours of oxidation was 0.12 weight percent of cumene hydroperoxide per hour instead of 0.5%. The rate of cumene hydroperoxide formation eventually reached was about the same as before, i. e. 0.95 weight percent per hour, but because of the long induction period the overall average rate after 44.7 hours of reaction was about 0.65 weight percent of cumeme hydroperoxide per hour instead of 0.8 weight percent. The yield of cumene hydroperoxide determined as above described was 89% of theory instead of 90.7%.

Like results were obtained in tests using the procedure above described at oxidation temperatures of 100° C. and 105° C. as summarized in the following table:

*Rates of CHP\* formation (in wgt. percent per hour)*

|  | First 5 hr. | Final | Average | Final CHP* Conc'n. (Wgt. percent) | Yields of CHP* in percent of theory |
|---|---|---|---|---|---|
| 100° C.: | | | | | |
| Treated Cumene | 1.1 | 1.4 | 1.3 | 25 | 91.1 |
| Untreated Cumene | 0.5 | 1.35 | 1.1 | 20 | 91.6 |
| 105° C.: | | | | | |
| Treated Cumene | 1.5 | 1.65 | 1.6 | 29 | 88.6 |
| Untreated Cumene | 1.1 | 1.8 | 1.5 | 23 | 89 |

*Cumene hydroperoxide.

Pretreatment with Activated Alumina as above-described employing treating temperature of about 75° C instead of room temperature gave substantially the same results as the pretreatment at room temperature.

*Example 2(a).*—200 cc. of mixed diisopropylbenzenes (chiefly meta- and para-) were shaken with 2.5% by weight of Activated Alumina and filtered twice. This treated diisopropylbenzene was poured into a conical flask maintained at 90° C., 1% by weight of powdered soda ash was added, and air was bubbled through the liquid at a rate sufficient to disperse the powder.

Samples were taken periodically, and iodometrically analyzed for hydroperoxide as isopropylcumene hydroperoxide. The concentrations, after 0, 2.5, and 7 hours were 1.8, 4.8, and 12.2 weight percent respectively. These correspond to a rate of 1.2 weight percent per hour for the initial 2.5 hours of oxidation, and a rate of 1.7 weight percent of isopropylcumene hydroperoxide per hour for the final 4.5 hours. The oxidation was stopped after 7 hours. The overall rate of formation of the hydroperoxide was 1.5 weight percent per hour.

*Example 2(b).*—When 200 cc. of diisopropylbenzene from the same source as that of part (a) were placed without pretreatment in a conical flask maintained at 90° C., and oxidized with air as in part (a) above, the hydroperoxide concentrations determined were 1.9, 3.8, and 10.7 weight percent after 0, 2.5, and 7 hours of oxidation, respectively. These correspond to hydroperoxide rates of formation of 0.8 weight percent per hour over the initial 2.5 hours, and 1.5 weight percent per hour over the final 4.5 hours. The overall rate of formation of isopropylcumene hydroperoxide during the 7 hours of oxidation was 1.3 weight percent per hour.

Quantities of Activated Alumina employed are suitably a few percent by weight as illustrated in the examples. Apparently, the effect of alumina is a function of its surface and accordingly those forms which present large surface area in contact with cumene, e. g., finely divided Activated Alumina, are effective in correspondingly small quantities. Ordinarily from 0.1 to 5% of alumina based on the weight of the cumene is sufficient, but greater amounts may be employed without deleterious effect. The amount of alumina which should be employed will depend upon the amount of impurities to be removed from the particular isopropylbenzene sample being treated.

Silica gel and activated charcoal, tested among other substances using conditions and procedure of the above example, show little or no effect either on rates or yields compared to rates and yields obtained when no pretreatment was employed.

Soda ash additive was employed in the above example to promote oxidation of cumene to cumene hydroperoxide as disclosed and claimed in my copending application Serial No. 105,648, filed July 19, 1949.

I claim:

1. In a process for oxidizing an isopropylbenzene to hydroperoxide by elemental oxygen in liquid phase, the improvement which comprises contacting said isopropylbenzene with porous, adsorptive alumina, separating isopropylbenzene from said alumina, and thereafter oxidizing isopropylbenzene so-treated to cumene hydroperoxide in liquid phase with elemental oxygen.

2. Process as defined in claim 1 wherein cumene is agitated with alumina in finely divided form and in quantities of the order of a few percent by weight of the cumene treated.

3. Process as defined in claim 1 wherein diisopropylbenzene is agitated with alumina in finely divided form and in quantities of the order of a few percent by weight of the diisopropylbenzene treated.

GEORGE G. JORIS.

REFERENCES CITED

The following references are of record in the file of this patent:

UNITED STATES PATENTS

| Number | Name | Date |
|---|---|---|
| 2,470,339 | Claussen et al. | May 17, 1949 |
| 2,547,938 | Hall et al. | Apr. 10, 1951 |